United States Patent [19]

Ramsey

[11] Patent Number: 4,642,155
[45] Date of Patent: Feb. 10, 1987

[54] THERMOPLASTIC FITTING ELECTRIC HEAT WELDING METHOD AND APPARATUS

[75] Inventor: Russel G. Ramsey, Holdenville, Okla.

[73] Assignee: Central Plastics Company, Shawnee, Okla.

[21] Appl. No.: 823,682

[22] Filed: Jan. 29, 1986

Related U.S. Application Data

[63] Continuation-in-part of Ser. No. 734,836, May 16, 1985, Pat. No. 4,602,148.

[51] Int. Cl.$^4$ .............................................. B32B 31/26
[52] U.S. Cl. .................... 156/359; 156/272.4; 156/274.2; 156/304.2; 156/379.7; 219/497; 219/535; 219/544; 264/272.11; 285/286; 285/292
[58] Field of Search ............... 156/272.4, 304.2, 359, 156/274.2, 379.7, 292, 273.9; 219/497, 535, 544, 61.5; 264/272.11; 285/286, 292

[56] References Cited

U.S. PATENT DOCUMENTS

| | | | |
|---|---|---|---|
| 4,117,311 | 9/1978 | Sturm | 219/535 X |
| 4,147,926 | 4/1979 | Stahli | |
| 4,334,146 | 6/1982 | Sturm | 156/273.9 X |
| 4,349,219 | 9/1982 | Sturm | |
| 4,486,650 | 12/1984 | Bridgstock et al. | |
| 4,511,791 | 4/1985 | Desai et al. | 219/497 |
| 4,602,148 | 7/1986 | Ramsey | 219/544 X |

Primary Examiner—David Simmons
Assistant Examiner—Jeff H. Aftergut
Attorney, Agent, or Firm—Laney, Dougherty, Hessin & Beavers

[57] ABSTRACT

A method and apparatus for electrically heat welding a thermoplastic fitting having an electric resistance heating element disposed therein whereby a regulated quantity of electric power is supplied to the heating element during the welding process and the making of a high quality weld is insured. In accordance with the method, a controlled electric power is supplied to the resistance heating element of the fitting. The initial magnitude of the current flowing through the heating element is sensed and compared with predetermined current levels for various sizes of fittings whereby the size of the fitting as well as the total time the controlled electric power should be supplied to the heating element of the fitting for the making of a high quality weld are determined. The magnitude of the current flowing through the heating element over the time the controlled electric power is supplied thereto is sensed at predetermined time intervals and compared with predetermined current levels for the size of fitting being welded to thereby determine if the welding process is proceeding abnormally at such time intervals. The electric power supplied to the heating element is terminated when it is determined that the welding process is proceeding abnormally or otherwise at the end of the total time determined to be required for the making of a high quality weld.

15 Claims, 7 Drawing Figures

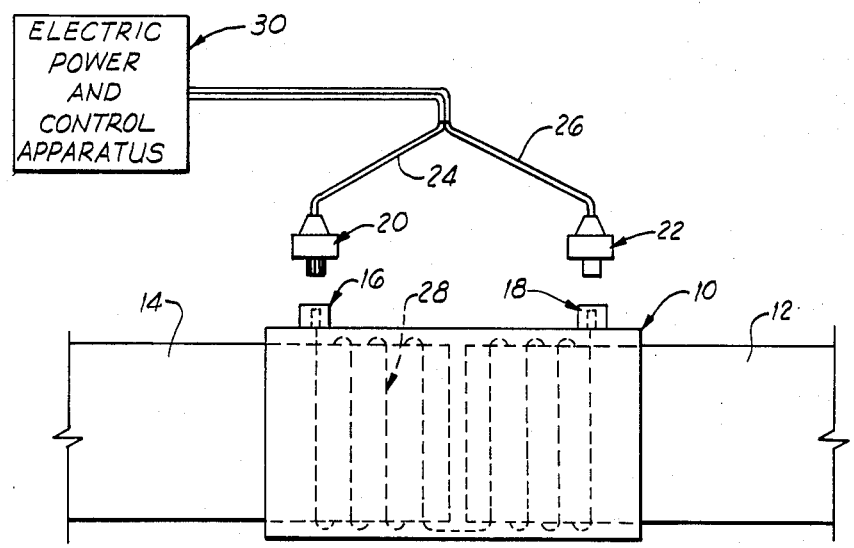
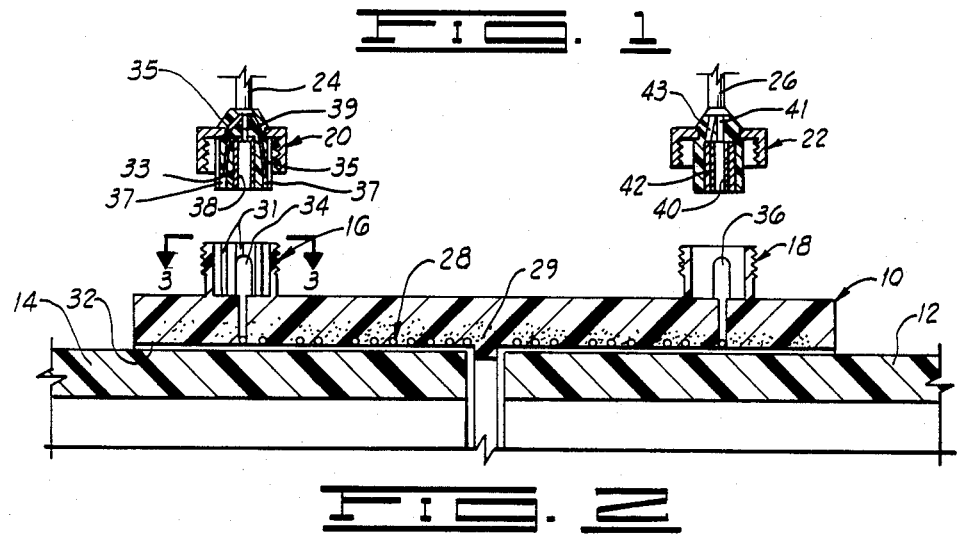
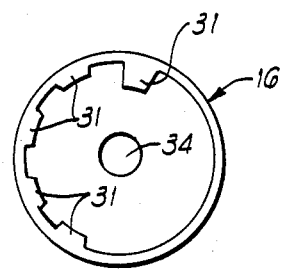

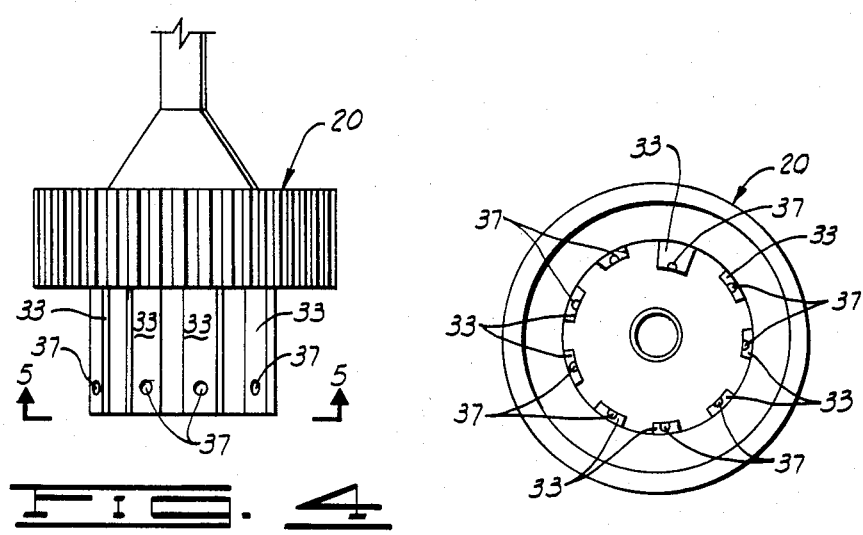
FIG. 4
FIG. 5
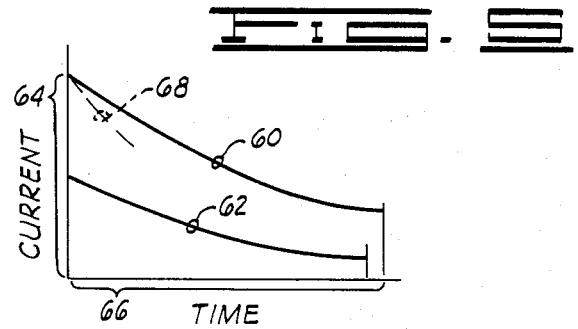
FIG. 6
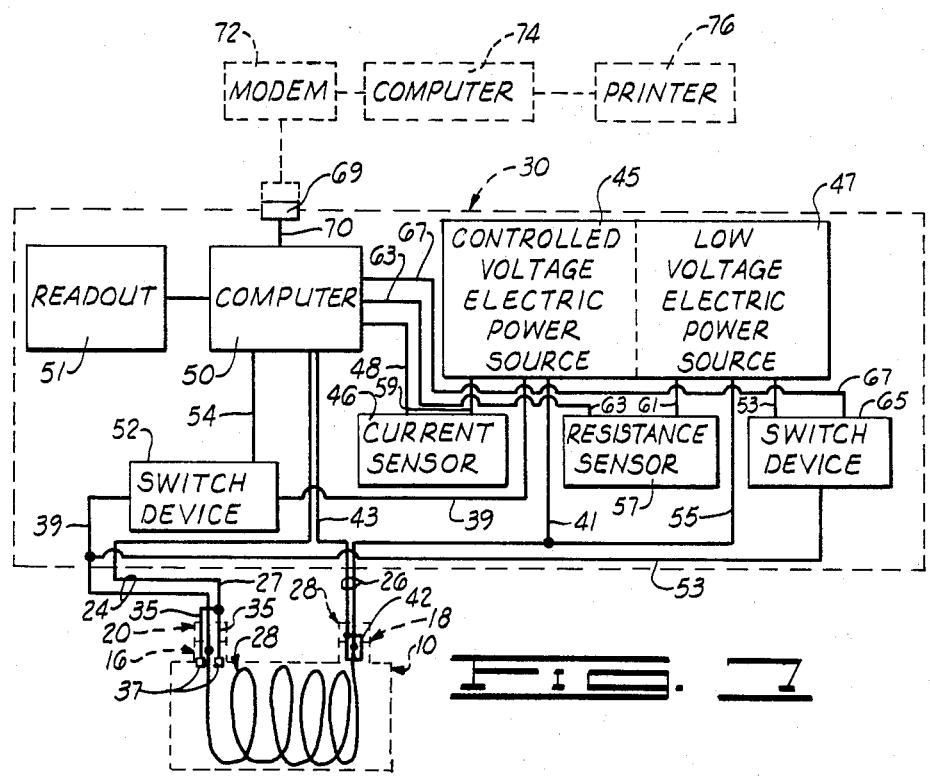
FIG. 7

THERMOPLASTIC FITTING ELECTRIC HEAT WELDING METHOD AND APPARATUS

CROSS REFERENCE TO RELATED APPLICATION

This application is a continuation-in-part of application Ser. No. 734,836 filed May 16, 1985, now U.S. Pat. No. 4,602,148.

BACKGROUND OF THE INVENTION

1. Field of the Invention

The present invention relates to thermoplastic fitting electric heat welding methods and apparatus, and more particularly, but not by way of limitation to methods and apparatus for electrically heat welding thermoplastic fittings having electric resistance heating elements disposed therein to other plastic members such as plastic pipe joints.

2. Description of the Prior Art

Electric heat weldable fittings formed of thermoplastic material have been developed and used heretofore. Such fittings generally include an electric resistance heating coil or element positioned adjacent the inside surfaces of the fitting which are to be welded to one or more other thermoplastic members such as plastic pipe sections. The electric resistance heating element is usually a coil of resistance wire disposed in the thermoplastic material of the fitting and is connected to electric contacts which are attached to an outside surface of the fitting. Examples of such electric heat weldable thermoplastic fittings are described in U.S. Pats. Nos. 4,147,926, issued Apr. 3, 1979, and 4,349,219, issued Sept. 14, 1982.

In welding the fitting to other plastic members positioned adjacent thereto, a source of electric power is connected to the contacts, such as by electric cable, and electric power is supplied to the resistance heating element of the fitting. The heating element heats the fitting and the adjacent thermoplastic members to temperatures which cause the thermoplastic materials from which the fitting and adjacent members are made to melt whereby they become fused or welded together.

The quality of the weld which results is primarily dependent upon the correct quantity of electric power being supplied to the heating element of the fitting. If too little electric power is supplied, too little heating takes place and an inadequate low strength weld results. If too much electric power is supplied, the fitting and plastic members to which the fitting is welded can be deformed and overheated whereby a good weld does not result. Other factors that affect the quality of the weld produced include heating elements abnormalities, e.g., short-circuits, poor fitting alignment, poor contact between surfaces to be welded, etc.

Various types of control and electric power generating apparatus have been utilized for supplying the electric power to electric heat weldable thermoplastic fittings. Initially, such apparatus was manually controlled by an operator and the quantity of electric power supplied to the heating elements of the fittings was determined by visual observation of the fittings as they were welded. More recently, control apparatus has been developed whereby the operator manually programs the control apparatus to supply a predetermined quantity of electric power to the heating element of the fitting in accordance with the particular size of the fitting. Also, electric heat weldable fittings having heating coils and separate resistors disposed therein have recently been developed. The values of the resistors are chosen in accordance with the size of the fitting and the electric power to be supplied thereto. Electric power control apparatus is utilized with such fittings adapted to sense the values of the resistors and automatically supply a preset quantity of electric power to the heating coil in accordance therewith. Examples of such fittings and control apparatus are described in U.S. Pat. No. 4,486,650, issued Dec. 4, 1984.

While the fittings including separate resistors and the control apparatus which automatically supply the heating coils of the fittings with predetermined quantities of electric power have generally achieved good results, because each of the fittings must include one or more resistors in addition to the resistance heating element disposed therein, they are more expensive to produce than fittings with heating elements alone. In addition, the electric power control apparatus have not included satisfactory provision for preventing the burn-up of fittings and the fire hazard attendant thereto when fittings having shorted-out heating coils are encountered. Also, the predetermined quantities of electric power supplied the fittings have not always been accurate because the temperatures of the fittings have not been taken into account. None of the prior electric control apparatus have been capable of detecting and accounting for defects such as bad electrical connections, misaligned pipe or other similar factors affecting the welding current or temperature.

By the present invention, a method and apparatus for electrically heat welding thermoplastic fittings are provided wherein the fittings do not require separate resistors or other devices for indicating the electric power required. In accordance with the present invention, the entire welding process of each fitting is comparatively monitored to insure the fitting and other aspects of the process are not defective and that the proper quantity of electric power is supplied to fitting.

SUMMARY OF THE INVENTION

A method and apparatus for electrically heat welding a thermoplastic fitting having an electric resistance heating element disposed therein are provided. The method comprises the steps of connecting the heating element of the fitting to an electric power source; supplying electric power to the heating element at a minimum voltage level for measuring the resistance of the heating element without significantly heating the element; measuring the resistance of the heating element and thereby determining the initial temperature of the element; supplying electric power to the heating element at a controlled voltage whereby the element is heated; sensing the initial magnitude of the current flowing through the heating element and comparing such magnitude and the initial temperature of the element with predetermined current levels for heating elements of various sizes of fittings at various temperatures to thereby determine the size of the fitting being welded and the total time the controlled electric power should be supplied to the heating element thereof to insure the making of a high quality weld; continuing to sense the magnitude of the current flowing through the heating element over the time the controlled electric power is supplied thereto and comparing such magnitude at predetermined time intervals with predetermined current levels for the size of fitting being welded to thereby determine if the welding process is proceeding abnormally at such time intervals; and terminating the supply of electric power to the heating element of the fitting when it is determined that the welding process is proceeding abnormally or otherwise at the end of the total time required for making a high quality weld.

It is, therefore, a general object of the present invention to provide thermoplastic fitting electric heat welding methods and apparatus.

A further object of the present invention is the provision of a method and apparatus for electrically heat welding thermoplastic fittings having heating elements disposed therein whereby the quantity of electric power supplied to the heating element is automatically determined and accurately controlled.

A further object of the present invention is the provision of a method and apparatus for electrically heat welding thermoplastic fittings wherein the quality of the fitting is determined early in the welding process and the application of electric power to the fitting terminated if such fitting is defective.

Yet a further object of the present invention is the provision of a method and apparatus for electrically heat welding thermoplastic fittings wherein the initial temperature of the fitting is taken into account and the temperature of the heating element is comparatively monitored along with the magnitude of the current flowing therethrough during the welding process to insure a high quality weld.

Other and further objects, features and advantages of the present invention will be readily apparent to those skilled in the art upon a reading of the description of preferred embodiments which follows when taken in conjunction with the accompanying drawings.

BRIEF DESCRIPTION OF THE DRAWINGS

FIG. 1 is a side view of an electric heat weldable thermoplastic sleeve having the ends of a pair of pipe sections inserted therein with the electric power and control apparatus of the present invention illustrated schematically in relation thereto;

FIG. 2 is an enlarged cross-sectional view of portions of the fitting, plastic pipe sections and electric power and control apparatus of FIG. 1;

FIG. 3 is a partial top view taken along line 3—3 of FIG. 2;

FIG. 4 is an enlarged view of one of the connectors of the electric power and control apparatus of FIG. 1;

FIG. 5 is a bottom view taken along line 5—5 of FIG. 4;

FIG. 6 is a graph showing the current-time relationships of different fittings; and FIG. 7 is a schematic illustration of the electric power and control apparatus of the present invention connected to a thermoplastic fitting having a resistance heating element disposed therein.

DETAILED DESCRIPTION OF PREFERRED EMBODIMENTS

Referring now to the drawings and particularly to FIGS. 1 and 2, an electric heat weldable thermoplastic sleeve 10 is illustrated with the ends of a pair of thermoplastic pipe sections 12 and 14 inserted therein. The sleeve 10 includes a pair of electric contact connectors 16 and 18 attached thereto for receiving complementary electric contactors 20 and 22 attached to the ends of electric cables 24 and 26, respectively. The cables 24 and 26 are connected to an electric power and control apparatus, generally designated by the numeral 30, which will be described in detail hereinbelow.

As best shown in FIG. 2, the thermoplastic fitting 10 includes an electric resistance heating element 28 disposed therein adjacent portions of the interior surface 32 thereof. The resistance heating element can take various forms, but preferably is a coil formed of electric resistance heating wire disposed in a spiral winding within the thermoplastic material forming the sleeve 10 adjacent the portions of the interior surface 32 which are to be welded to the exterior surfaces of the pipe sections 12 and 14. The opposite ends of the heating wire 28 are connected to upstanding electric contact pins 34 and 36 disposed within the connectors 16 and 18. As will be understood, the complementary connectors 20 and 22 of the electric power and control apparatus 30 are adapted for removable connection to the connectors 16 and 18 of the sleeve 10.

The connectors 20 and 22 include electric contact sockets 38 and 40, respectively, for engagement with the electric contact pins 34 and 36 of the connectors 16 and 18. The socket contact 38 is connected to a wire 39 extending through the cable 24 and the socket contact 40 is connected to a wire 41 extending through the cable 26. The connector 22 also includes a temperature sensing device 42 such as a thermister, RTD, or thermocouple positioned in heat conducting relationship with the socket contact 40 which is connected to a multiple lead wire 43 also extending through the cable 26. The device 42 senses the temperature of the contact pin 36 when the socket contact 40 is engaged with the pin 36. That is, when the connector 22 is connected to the connector 18 of the sleeve 10, the temperature sensing device 42 senses an initial temperature which is representative of the outside surface temperature of the entire sleeve 10.

As shown in FIGS. 2 and 3, the connector 16 of the fitting 10 includes one or more (preferably one to nine) longitudinal code ridges 31 molded around the inside periphery thereof. As illustrated in FIG. 3, one or more of the ridges 31 can be enlarged so that it also functions as a position guide for the complementary contactor 20. Each size of fitting 10 will include a connector 16 having a particular number and/or arrangement of code ridges 31 molded therein indicating that particular size. For example, the arrangement illustrated in FIG. 3 (5 ridges) could indicate a 5-inch size fitting. As illustrated in FIGS. 2, 4 and 5, the complementary connector 20 includes nine longitudinal recesses 33 which are complementary to the one to nine ridges 31 which may be included in the connector 16. Thus, when the connectors 16 and 20 are connected together the one or more code ridges 31 of the connector 16 are disposed within complementary recesses 33 of the connector 20. The connector 20 also includes a code ridge sensing device, such as a micro-switch 37, disposed in each of the recesses 33 to detect the presence of a code ridge therewithin. The micro-switches 37 are electrically connected to leads 35 of a multiple lead wire 27 which extends through the cable 24.

As will be described further hereinbelow, when the fitting 10 is to be fused or welded to the pipe sections 12 and 14, the connectors 20 and 22 attached to the cables 24 and 26 are removably connected to the connectors 16 and 18 of the sleeve 10 whereby an electric circuit is completed between the heating element 28 of the fitting 10 and the electric power and control apparatus 30. The electric power and control apparatus 30 operates in the manner described hereinbelow to provide electric power to the heating element 28 which causes the heating element to heat the thermoplastic material forming the sleeve 10 and the thermoplastic material forming the ends of the pipe sections 12 and 14 inserted within the interior of the sleeve 10. The heating causes the thermoplastic material of the fitting 10 and pipe sections 12 and 14 to melt and fuse together to thereby form welds between the fitting 10 and the pipe sections 12 and 14.

Referring now to FIG. 7, the electric power and control apparatus 30 of the present invention is schematically illustrated connected to the heating element 28 of the sleeve 10 by way of the cables 24 and 26 and the connectors 16, 18, 20 and 22. The apparatus 30 includes a controlled voltage electric power source 45 which is connected by means of the wires 39 and 41 extending through the cables 24 and 26 to the contact sockets 38 and 40 of the connectors 20 and 22. A low voltage electric power source 47 is also included in the apparatus 30 which is connected to the wires 39 and 41 by wires 53 and 55, respectively. The contact sockets 38 and 40 of the connectors 20 and 22 are connected to the contact pins 34 and 36 of the connectors 16 and 18 of the sleeve 10 which are in turn connected to the heating element 28 of the fitting 10.

A current sensor 46 for sensing the current flowing from the power source 45 to the heating element 28 is electrically connected to the power source 45 by a lead 59 with the output signal therefrom connected by a lead 48 to an electronic computer 50. A resistance sensor 57 for sensing the resistance of the heating element 28 when minimum voltage electric power is applied thereto is electrically connected to the power source 47 by a lead 61 with the output signal therefrom connected to the computer 50 by a lead 63. The temperature sensing device 42, previously described, is connected by the wire 43 attached thereto and extending through the cable 26 to the computer 50, and the microswitches 37 of the connector 20 are connected to the computer 50 by the multiple lead wire 27.

A switch device 52 such as a TRICAC or SCR is provided in the circuit between the heating element 28 and the power source 45 which is operably connected to the computer 50 by a lead 54. A similar switch device 65 is provided in the circuit connecting the power source 47 to the wires 39 and 41 which is connected to the computer 50 by a lead 67. The computer 50 includes a readout module 51 operably connected thereto for visually indicating various modes of operation of the apparatus 30 such as a shutdown due to a defective fitting, etc. Also, the computer 50 is connected to a communication interface 69 by a lead 70 which in turn can be connected to a modem 72, a second computer 74 and a printer 16.

In operation of the apparatus 30 for electrically heat welding the thermoplastic fitting 10 by means of the heating element 28 disposed therein, the connectors 20 and 22 are first connected to the connectors 16 and 18 of the fitting 10. When the apparatus 30 is turned on, the computer 50 first closes the switch device 65 thereby completing a circuit between the low voltage electric power source 47 and the heating element 28 of the fitting 10 by way of the wires 39, 41, 53 and 55 connected therebetween. The low voltage electric power applied to the heating element 28 is at a minimum level sufficient for the resistance sensor 57 to measure the resistance of the element 28, but too low to significantly heat the element. The resistance value so measured is communicated to the computer 50 by the lead 63 and the computer 50 then opens the switch device 65.

The computer 50 determines the initial temperature of the element 28 which corresponds to the measured resistance value, and the initial outside surface temperature of the fitting 10 is sensed by the computer 50 by means of the temperature sensing device 42 and the wire 43 connected thereto. Also, the computer 50 senses the size of the fitting 10 by means of the code ridges in the connector 16, the micro-switches 37 of the connector 20 activated thereby and the wire 27 connected thereto.

The computer 50 next closes the switch device 52 thereby completing a circuit between the controlled voltage electric power source 45 and the heating element 28 by way of the wires 39 and 41 connected therebetween. The computer 50 senses the initial magnitude of the current flowing through the heating element 28 by means of the current sensor 46 and lead 48. The initial temperature of the heating coil 28 and the initial magnitude of the current flowing therethrough are compared by the computer 50 with predetermined current levels for various sizes of fittings at various temperatures in the memory of the computer to determine the size of the fitting being welded. Such size is compared to the size of fitting indicated by the micro-switches 37, and if the same, the supply of controlled voltage electric power to the element 28 is continued, and the total time such power should be supplied to the element 28 to insure the making of a high quality weld is determined.

Referring to FIG. 6, the current-time relationship during the making of a high quality weld for two different sizes of fittings using controlled electric power is illustrated graphically. The top curve, designated by the numeral 60, represents the welding process for a two-inch sleeve and the bottom curve, designated by the numeral 62, represents the welding process for a one-inch sleeve. As shown, the current levels are different for the different sizes of sleeve, and each size and type of electrically heat weldable thermoplastic fitting has a current-time relationship which is characteristic of that fitting when a high quality weld is formed using a proper quantity of controlled electric power.

The computer 50 includes such current-time relationship information for a variety of electric heat weldable thermoplastic fittings in the memory thereof whereby the computer 50 can make the comparisons described and identify the size of fitting being welded from the initial magnitude of current flowing through the heating element. Upon identification of the fitting, the computer determines the total time the controlled electric power should be supplied to the heating element for the making of a high quality weld from the information in memory and the initial temperature of the fitting. For example, referring to FIG. 6, if the initial magnitude of the current flowing through the heating element of a fitting is that designated by the numeral 64, the computer will determine that the fitting is a two-inch sleeve represented by the curve 60. The computer will also then determine from the curve 60 that the total time the controlled electric power should be supplied to the heating element for the making of a high quality weld is the time designated by the numeral 66.

The computer 50 continues to sense the magnitude of the current flowing through the heating element of the fitting being welded over the time the controlled electric power is supplied thereto and compares such magnitude at predetermined time intervals with predetermined current levels for the size of fitting being welded, i.e., for the two-inch sleeve of FIG. 6, the computer would compare the actual current level with the current levels of the curve 60 at frequent predetermined time intervals. As long as the sensed current levels are substantially the same as the current levels in memory for the size of fitting being welded, the computer continues the welding process to the total time determined to be required for the making of a high quality weld. If the sensed current levels deviate from the current levels in memory, as for example the deviation shown by the dashed line 68 of FIG. 6, the computer 50 determines the welding process is proceeding abnormally and terminates the welding process by turning off the electric power. The operator of the apparatus 30 is informed of the shutdown and the reason therefor by way of the readout 51.

The initial temperature of the outside surface of the fitting 10 and the initial temperature of the heating element 28 of the fitting 10 sensed by the computer 50 as described above can be utilized by the computer 50 to determine if increases or decreases in the determined total time the constant voltage electric power should be supplied to the heating element are required to cause the melting of the required quantity of thermoplastic material. That is, based on such temperatures and the size of fitting, the computer 50 can calculate the total time required for the optimum quantity of thermoplastic material making up the fitting being welded and the pipe sections in contact therewith to melt and adjust the previously determined total time if necessary.

As long as the welding process proceeds normally, it is allowed to continue to the end of the time determined to be required for the making of a high quality weld whereupon the computer 50 terminates the supply of electric power from the power source 47 to the heating element 28 of the fitting 10 being welded by operation of the switch device 52. Upon terminating the supply of electric power from the source 47, the computer 50 again measures the resistance of the element 28 and determines the final temperature thereof in the same manner as described above for measuring the initial temperature of the element 28.

In order to facilitate the making of a high quality weld, alternating current is supplied to the heating element of the fitting being welded by the controlled voltage electric power source 45 of the apparatus 30. The frequency of the alternating current is adjusted to that frequency which best causes the fitting being welded to vibrate as a result of the magnetic fields produced by the alternating current flowing through the heating element of the fitting. Such vibration facilitates and promotes the fusing of the softened thermoplastic materials of the fitting and other plastic members being welded thereto.

In order to concentrate the magnetic fields created by the alternating current and amplify the vibration produced thereby, conductive metallic material can be attached to or included in the weldable thermoplastic fittings. For example, as illustrated in FIG. 2, iron filings 29 can be suspended in the thermoplastic material forming the fitting 10.

During and upon completion of the welding process described above, the computer 50 records in its memory the various temperatures, current magnitudes and other variables sensed and determined during the welding process. For example, the computer 50 can record the initial temperature of the outside surface of the fitting, the initial temperature of the heating element of the fitting, the size of the fitting, the determined time the constant voltage electric power should be supplied to the fitting, the magnitudes of current flowing over the time constant voltage electric power is supplied to the heating element of the fitting, the final temperature of the heating element, and the total time the constant voltage electric power is supplied to the heating element. Such recorded information can be communicated to a second computer 74 at a remote location by way of the communication interface 69 and a modem 72 connected thereto. The information can be printed by a printer 76 connected to the computer 74 or utilized in any other desired way. If the supply of electric power is terminated as a result of the welding process proceeding abnormally, the nature of the abnormality will be apparent from the recorded information.

Thus, the present invention is well adapted to carry out the objects and attain the ends and advantages mentioned as well as those inherent therein. While presently preferred embodiments of the invention have been described for purposes of this disclosure, numerous changes in the arrangement of steps and parts can be made by those skilled in the art, which changes are encompassed within the spirit of this invention as defined by the appended claims.

What is claimed is:

1. A method of electrically heat welding a thermoplastic fitting having an electric resistance heating element disposed therein whereby a predetermined regulated quantity of electric power is supplied to the heating element during the welding process and the making of a high quality weld is insured comprising the steps of:
   (a) connecting said heating element of said fitting to an electric power source;
   (b) supplying electric power to said heating element at a minimum voltage level for measuring the resistance of said element without significantly heating said element;
   (c) measuring the resistance of aid heating element and thereby determining the initial temperature of said element;
   (d) supplying electric power to said heating element at a controlled voltage whereby said element is heated;
   (e) sensing the initial magnitude of the current flowing through said heating element and comparing such magnitude and said initial temperature of said element with predetermined current levels for heating elements of various sizes of fittings at various temperatures to thereby determine the size of said fitting being welded and the total time the controlled voltage electric power should be supplied to said heating element of said fitting to insure the making of a high quality weld;
   (f) continuing to sense the magnitude of the current flowing through said heating element over the time said controlled voltage electric power is supplied thereto and comparing such magnitude at predetermined time intervals with predetermined current levels for the size of fitting determined in step (e) to thereby determine if the welding process is proceeding abnormally at such time intervals; and
   (g) terminating the supply of electric power to said heating element of said fitting when it is determined that said welding process is proceeding abnormally in step (f) or otherwise at the end of the total time required for the making of a high quality weld as determined in accordance with step (e).

2. The method of claim 1 which is further characterized to include the steps of:
   after step (g), supplying electric power to said heating element at a minimum voltage level for measuring the resistance of said element without significantly heating said element; and
   measuring the resistance of said heating element and thereby determining the final temperature of said element.

3. The method of claim 1 which is further characterized to include the step of recording information relating to said welding process comprising the initial temperature of said heating element determined in step (c), the size of fitting and the time electric power should be supplied thereto determined in step (e), the magnitudes of current flowing over the time electric power is supplied sensed in step (f), and the total time constant voltage electric power is supplied to said heating element of said fitting.

4. The method of claim 1 which is further characterized to include the steps of:
   sensing the initial temperature of the outside surface of said fitting;
   determining the increase or decrease in the time at which the supply of constant voltage electric power is terminated in step (g) to cause a proper quantity of thermoplastic material making up said fitting to melt based on the initial temperature of said element determined in step (c) and the sensed initial outside surface temperature of said fitting; and
   adjusting the time at which the supply of electric power is terminated in step (g) in accordance with said increase or decrease.

5. The method fo claim 1 wherein the current of said controlled voltage electric power supplied to said heating element of said fitting is alternating current.

6. The method of claim 5 wherein the frequency of said alternating current is at a level such that said fitting is caused to be vibrated by the magnetic fields produced thereby during said welding.

7. A method of electrically heat welding a thermoplastic fitting having an electric resistance heating element disposed therein whereby a predetermined regulated quantity of electric power is supplied to the heating element during the welding process and the making of a high quality weld is insured comprising the steps of:
   (a) sensing the initial temperature of the outside surface of said fitting;
   (b) connecting said heating element of said fitting to an electric power source;
   (c) supplying electric power to said heating element at a minimum voltage level for measuring the resistance of said element without significantly heating said element;
   (d) measuring the resistance of said heating element and thereby determining the initial temperature of said element;
   (e) supplying electric power to said heating element at a controlled voltage whereby said element is heated;
   (f) sensing the initial magnitude of the current flowing through said heating element and comparing such magnitude and said initial temperature of said element with predetermined current levels for heating elements of various sizes of fittings at various temperatures to thereby determine the size of said fitting being welded and the total time the controlled voltage electric power should be supplied to said heating element of said fitting to insure the making of a high quality weld;
   (g) continuing to sense the magnitude of the current flowing through said heating element over the time said controlled electric power is supplied thereto and comparing such magnitude at predetermined time intervals with predetermined current levels for the size of fitting determined in step (f) to thereby determine if the welding process is proceeding abnormally at such time intervals;
   (h) determining the increase or decrease in the total time the controlled voltage electric power should be supplied to said heating element to cause a proper quantity of thermoplastic material making up said fitting to melt based on the initial temperature of said element determined in step (d) and the initial outside surface temperature of said fitting determined in step (a);
   (i) adjusting the time the supply of electric power should be supplied to said heating element in accordance with said increase or decrease;
   (j) terminating the supply of electric power to said heating element of said fitting when it is determined that said welding process is proceeding abnormally in step (g) or otherwise at the end of the total time required for the making of a high quality weld as determined in accordance with step (i);
   (k) supplying electric power to said heating element at a minimum voltage level for measuring the resistance of said element without significantly heating said element; and
   (l) measuring the resistance of said heating element and thereby determining the final temperature of said element.

8. The method of claim 7 which is further characterized to include the step of recording information relating to said welding process comprising the initial temperature of the outside surface of said fitting determined in step (a), the initial temperature of said heating element determined in step (d), the size of fitting and the time electric power should be supplied thereto determined in step (f), the magnitudes of current flowing over the time electric power is supplied to said heating element sensed in step (g), the final temperature of said heating element determined in step (j), and the total time constant voltage electric power is supplied to said heating element of said fitting.

9. The method of claim 8 wherein the current of said controlled voltage electric power supplied to said heating element of said fitting is alternating current.

10. The method of claim 9 wherein the frequency of said alternating current is at a level such that said fitting is caused to be vibrated by the magnetic fields produced thereby during said welding process.

11. Apparatus for electrically heat welding a thermoplastic fitting having an electric resistance heating element disposed therein connected to a pair of electric contacts attached to said fitting whereby a regulated quantity of electric power is supplied to the heating element during the welding process and the making of a high quality weld is insured comprising:
   (a) first electric power generating means for producing controlled voltage electric power to heat said heating element of said fitting;

(b) second electric power generating means for producing low voltage electric power for measuring the resistance of said element without significantly heating said element;

(c) current sensor means for sensing the magnitude of the current flow from said first electric power generating means electrically connected thereto;

(d) resistance sensor means for sensing the magnitude of the resistance of said heating element electrically connected to said second electric power generating means;

(e) electric cable means connected to said first and second electric power generating means and adapted for removable connection to said electric contacts of said fitting for conducting electric power to said electric resistance heating element of said fitting;

(f) switch means electrically connected between said first and second electric power generating means and said cable means; and (g) computer means operably connected to said current sensor means, said resistance sensor means and said switch means for receiving the resistance of said heating element and determining the initial and final temperatures of said element therefrom, for receiving and comparing the initial temperature of said heating element and the initial magnitude of the current flowing from said first electric power generating means through said heating element with predetermined temperatures and current levels for various sizes of fittings and thereby determining the size of fitting being welded and the total time the constant voltage power from said first power generating means should be supplied to said heating element for the making of a high quality weld, for comparing the magnitude of the current flowing through said heating element from said first power generating means at predetermined time intervals with predetermined current levels for the size of fitting being welded to thereby determine if the welding process is proceeding abnormally at such time intervals, for operating said switch means to start and terminate the supply of electric power to said heating element from said first and second electric power generating means, and for operating said switch means to terminate the supply of electric power to said heating element from said first electric power generating means when said welding process is proceeding abnormally or otherwise at the end of the total time determined to be required for the making of a high quality weld.

12. The apparatus of claim 11 which is further characterized to include;
temperature sensing means attached to said cable means and adapted for connection to at least one of said electric contacts of said fitting to thereby sense the temperature of the outside surface of said fitting; and
said computer means being operably connected to said temperature sensor means for determining the increase or decrease in the total time said electric power is supplied to said heating element from said first electric power generating means to cause a proper quantity of thermoplastic material making up said fitting to melt based on the initial temperature of said fitting and the sensed initial temperature of the outside surface of said fitting and to adjust said total time accordingly.

13. The apparatus of claim 11 which is further characterized to include:
fitting identification means attached to said cable means and adapted for connection to at least one of said electric contacts of said fitting to thereby identify the size of said fitting; and
said computer means being operably connected to said fitting identification means for selectively determining the total time electric power should be supplied to said heating element based on the size of fitting so identified, or comparing the size of fitting so identified with the size of fitting determined based on the initial temperature and magnitude of current flowing through said heating element and operating said switch means to terminate the supply of power to said fitting if such sizes are not the same.

14. The apparatus of claim 11 wherein said first electric power generating means produces alternating current.

15. The apparatus of claim 14 wherein the frequency of said alternating current produced by said first electric power generating means is at a level such that said fitting is vibrated by the magnetic fields produced thereby during said welding process.

* * * * *